US009584578B2

(12) United States Patent
Amalapurapu et al.

(10) Patent No.: US 9,584,578 B2
(45) Date of Patent: Feb. 28, 2017

(54) CROSS PLATFORM USER JOINING

(71) Applicant: BloomReach Inc., Mountain View, CA (US)

(72) Inventors: Suchitra Amalapurapu, Bangalore (IN); Anand Raghuraman, Campbell, CA (US); Rahul Bhandari, San Mateo, CA (US); Pradeep Muthukrishnan, Mountain View, CA (US); Jasvinder Singh, Bangalore (IN); Ashutosh Garg, Sunnyvale, CA (US)

(73) Assignee: BloomReach Inc., Mountain View, CA (US)

( * ) Notice: Subject to any disclaimer, the term of this patent is extended or adjusted under 35 U.S.C. 154(b) by 128 days.

(21) Appl. No.: 14/264,569

(22) Filed: Apr. 29, 2014

(65) Prior Publication Data

US 2014/0337513 A1   Nov. 13, 2014

Related U.S. Application Data

(60) Provisional application No. 61/822,800, filed on May 13, 2013.

(51) Int. Cl.
*H04L 12/26* (2006.01)
*G06Q 30/02* (2012.01)
*H04L 29/08* (2006.01)
*G06F 17/30* (2006.01)
*H04L 29/12* (2006.01)

(52) U.S. Cl.
CPC ........ *H04L 67/00* (2013.01); *G06F 17/30702* (2013.01); *G06F 17/30861* (2013.01); *H04L 61/103* (2013.01); *H04L 61/2084* (2013.01); *H04L 67/20* (2013.01); *H04L 67/22* (2013.01); *H04L 67/306* (2013.01); *G06Q 30/0251* (2013.01); *G06Q 30/0269* (2013.01)

(58) Field of Classification Search
CPC ........... G06F 17/3053; G06F 17/30864; G06F 17/3089; G06F 17/30; G06F 17/30011; G06F 17/30088; G06F 17/30203; G06F 17/30598; G06F 17/30867; G06F 7/00; G06Q 30/02; H04L 43/04
USPC ........... 709/221, 223, 224; 706/12; 716/100, 716/103, 122; 715/735, 736
See application file for complete search history.

(56) References Cited

U.S. PATENT DOCUMENTS

| | | |
|---|---|---|
| 2008/0108308 A1 | 5/2008 | Ullah |
| 2009/0276377 A1 | 11/2009 | Dutta et al. |
| 2011/0246297 A1 | 10/2011 | Buchalter et al. |
| 2011/0295661 A1 | 12/2011 | Dodge et al. |
| 2012/0109734 A1 | 5/2012 | Fordyce et al. |
| 2012/0109956 A1 | 5/2012 | Ramaiyer et al. |
| 2012/0124456 A1 | 5/2012 | Perez et al. |
| 2012/0271860 A1* | 10/2012 | Graham, Jr. ........... G06Q 30/02 707/798 |

(Continued)

*Primary Examiner* — Patrice Winder
*Assistant Examiner* — Abderrahmen Chouat
(74) *Attorney, Agent, or Firm* — Van Pelt, Yi & James LLP

(57) ABSTRACT

Techniques for cross platform user joining are disclosed. In some embodiments, cross platform user joining includes associating a first user identification (UID) and a second UID with one or more Internet Protocol addresses (IPs); associating the first UID and the second UID with one or more monitored behaviors; and joining the first UID and the second UID based on the one or more IPs and the one or more monitored behaviors.

15 Claims, 9 Drawing Sheets

(56) References Cited

U.S. PATENT DOCUMENTS

2013/0097518 A1      4/2013   Pearcy
2014/0136333 A1*     5/2014   Shoshitaishvili .. G06Q 30/0269
                                                        705/14.66

* cited by examiner

Offline Method

Online Method

CROSS PLATFORM USER JOINING

CROSS REFERENCE TO OTHER APPLICATIONS

This application claims priority to U.S. Provisional Patent Application No. 61/822,800 entitled CROSS PLATFORM USER JOINING filed May 13, 2013, which is incorporated herein by reference for all purposes.

BACKGROUND OF THE INVENTION

Internet-based web services can be delivered through web sites on the World Wide Web (WWW). A web site is typically a set of related web pages served from a web domain. Web pages are often formatted using HyperText Markup Language (HTML), eXtensible HTML (XHTML), or using another language that can be processed by a web browser that is typically executed on a user's client device, such as a computer, tablet, phablet, smart phone, smart television, or other client device. A web site is generally hosted on a web server. The web server is typically accessible via a network, such as the Internet, through a web address, which is generally known as a Uniform Resource Indicator (URI) or a Uniform Resource Locator (URL).

For example, a web service can be delivered via a web site. In some cases, the web site can allow users to access content delivered via the web site using anonymous user access. Some web sites can allow or require that users login to access some or all of the content delivered via the web site (e.g., subscription access may be required to access certain content on the web site, such as for an online newspaper, an e-commerce shopping site, a social networking web site, a web-based email service, a file sharing web site, and/or other web services).

A web site can be a static web site. Generally, a static web site does not customize content delivered to different users of the web site (e.g., a static web site has web pages stored on a web server in the format that is sent to a client web browser).

A web site can be a dynamic web site or can include dynamic web pages. Generally, a dynamic web site can customize content delivered to different users of the web site (e.g., a dynamic web site is one that can change or customize web content automatically).

BRIEF DESCRIPTION OF THE DRAWINGS

Various embodiments of the invention are disclosed in the following detailed description and the accompanying drawings.

DETAILED DESCRIPTION

Figure 1:
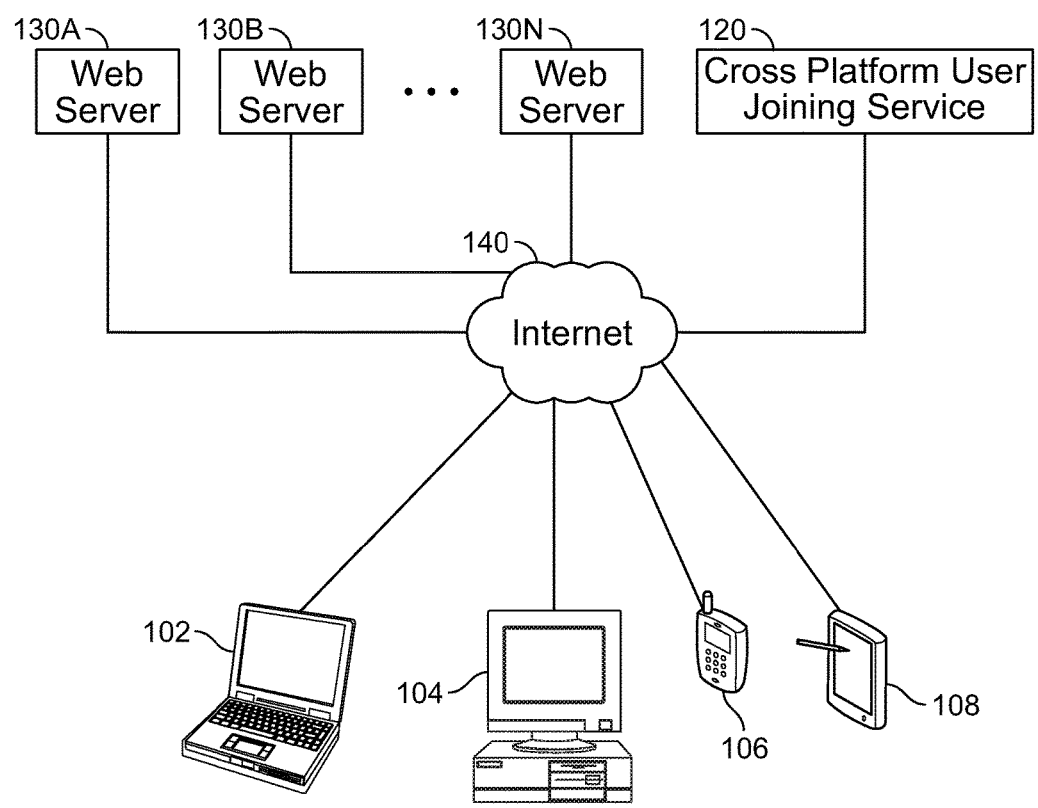
FIG. 1 is a block diagram illustrating an overview of an architecture of a system for providing cross platform user joining in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Existing web sites can generally track activities of users on the web site (e.g., monitoring and tracking a user's browsing activity during a session on the web site). For example, the web site can use cookies (e.g., in pixel logs, in which cookies are used to identify a user, at least anonymously, per device, and in which the cookies are typically persistent on the device, that is, the cookies are stored across sessions) or other approaches to track a user's activity on the web site. Thus, what is being actively browsed, viewed, and/or other user activities on the web site can be tracked. But if the user is anonymously accessing (e.g., browsing) the web site (e.g., if the user has not logged into/signed into the web site and/or has not otherwise verified the user's identity with the web site using a type of user authorization/authentication, such as username, a username and password, a biometric verification of a user, a token, or other schemes or combinations thereof), then the web site generally cannot associate such tracked user activities with a specific/confirmed user identity.

However, as web sites continue to develop new services and content for users, there is an increasing need to be able to identify users even if the user has not logged into the web site and/or has not otherwise authenticated or verified the user's identity with the web site.

For example, there is a need for service providers to control the manner of presentation and/or to customize the content and/or services that are presented for each user. Customization and personalization with respect to interface, content, and other aspects can lead to additional revenue for the service provider and can also provide a better user experience for its users. Thus, one approach that web service providers can use is to employ user identification systems to collect data to form user profiles, and the web service providers can use this data to personalize the content and form of their services (e.g., through dynamic web site implementations that can customize content delivered to users based on such user profiles).

To identify users, web service providers have traditionally relied on the user's signing or logging into the web site in order to access the web site. Sign-in/log-in based authorization on its own is generally very restrictive in that it will often only identify a fraction of users to a web site (e.g., as further discussed below, due to the fact that many users opt to browse a web site without signing/logging into that web site, such as for users that have not created sign-in credentials on that site, and this also often occurs in cases in which such users have sign-in credentials for that site, but elect not to sign-in due to user convenience or other reasons).

Specifically, the sign-in (e.g., also referred to as log-in) based authorization approach applied by web service providers generally does not provide sufficient user related data for at least the following reasons.

First, users can visit web sites anonymously. In particular, users often visit web sites anonymously, that is, without signing-in. As a result, it is difficult for such web sites to identify these users. Although this problem is not limited to any particular device type (e.g., desktop, laptop, tablet, phablet, smart phone, or another device type), it is generally a more prevalent issue for users browsing web sites on their mobile devices (e.g., tablets, phablets, smart phones or other types of mobile phones, and other types of mobile devices).

Second, users can have more than one device. With the proliferation of Internet connected devices, a single user may use many devices (e.g., tablet, home computer/laptop, work computer/laptop, mobile phone, smart TV, and/or other devices). As a result, users may browse content and, thus, create data for a user profile across such devices. However, this information can be valuable in generating a complete profile of the user.

Specifically, the combination of these two problems means that without a user sign-in on each device, a service provider (e.g., a web service provider) will not be able to determine that the user behind the multiple devices is the same user or is likely the same user.

More specifically, an inability to be able to identify users creates several different problems for the web service provider. The inability to be able to identify users makes it difficult for the service provider to personalize or customize the web site for each user. For example, the service provider cannot effectively provide customized content for the user if the service provider cannot identify the user across devices (e.g., user platform). Furthermore, the site provider cannot connect user activity across devices to create user profiles. As a result, a typical approach is for service providers to simply attribute actions to devices instead of users (e.g., users that can be associated with two or more devices). For many service providers, these user profiles will continue to be split across devices if users are not signed in on each device that they use to access the service (e.g., to access the service provider's web site).

Further, web services providing online content (e.g., dynamic or other customized content for a web site) can be customized to provide different content to different users. However, as discussed above, customizing online content based on users is not effective if the user cannot be identified (e.g., a user that did not log into the web service), and the user accesses the web service from two or more devices.

In a common scenario, assume that a user, named Bob, browses a web service, such as ACME.com, during a session from Bob's smart phone without logging into the web service (e.g., anonymously browsing a web site of the web service without using a sign-in or other based authorization technique). In this scenario, Bob and Bob's smart phone are typically just associated using an identifier (ID) via a cookie associated with that session (e.g., cookies can be stored past a given session, that is, cookies can be persistently stored, in this example, on Bob's smart phone). However, Bob would not be identified as the same user when browsing that web service, which is ACME.com in this example, using a different user platform/device, such as from Bob's laptop computer. In such cases, the web service, ACME.com, cannot customize content for Bob that is uniquely identified, such as when Bob is browsing ACME.com anonymously from a different device, such as Bob's laptop computer. Moreover, this inability to identify users who access web services anonymously across different devices/user platforms also results in a fragmented data set for user profiles for such web services. As a result, this also creates challenges for the web services to accurately and effectively customize content and associated information that web services desire to generate, for example, various e-commerce related metrics, such as lifetime value of a user, and/or various other e-commerce related activities, such as user profile-based targeted advertisements or targeted service/product offerings.

Thus, what are needed are techniques for identifying users of a web site(s) even if the user has not signed into the web site, including for users that access such web site(s) from multiple different devices/user platforms.

Accordingly, techniques for cross platform user joining are disclosed.

In some embodiments, by using various signals, such as Internet Protocol (IP) addresses, in joining users across platforms, this technique offers increased coverage of joined users and more complete user profiles (e.g., provides additional information by associating two or more, in some cases, anonymous user profiles). In particular, this technique does not rely solely on sign-in authentication to identify a user (e.g., in some cases, the exact user is not identified, but an anonymous user profile across platforms can be created using various techniques described below, and as further discussed below, in some cases one or more anonymous user profiles can be joined with a user identified user profile using sign-in, user provided information, and/or other techniques).

In some embodiments, cross platform user joining includes associating a first user identification (UID) and a second UID with one or more Internet Protocol addresses (IPs); associating the first UID and the second UID with one or more monitored behaviors; and joining the first UID and the second UID based on the one or more IPs and the one or more monitored behaviors.

For example, the first UID can be associated with a first set of monitored behaviors, and the second UID can be associated with a second set of monitored behaviors. Also, the first UID can be associated with a first user platform, and the second UID can be associated with a second user platform. In some instances, the first UID can be associated with a first mobile device, and the second UID can be associated with a second mobile device, and at least one of the first UID and the second UID can correspond to an anonymous UID.

In an example implementation, the one or more monitored behaviors can be tracked using a pixel log. In addition, the one or more IPs are tracked using a pixel log.

In one embodiment, cross platform user joining further includes monitoring user browsing activity on a web site to associate two or more anonymous user profiles. In particular, in order to associate two or more anonymous user profiles, various techniques for cross platform user joining are disclosed herein. For example, in order to monitor user browsing activity on a web site, pixel logs can be implemented on the web site. Additionally, various algorithms for cross platform user joining can be applied to determine which of a set of anonymous profiles can be joined (e.g., and with a determined confidence/probability level). As a result, such cross platform user joining can provide the web site service provider the ability to provide customized content and/or targeted web services to the user browsing the web site anonymously based on the enhanced user profile data. In some implementations, a cloud service provides suggested/ customized web content for subscribing merchant web sites (e.g., suggested content/products/categories, etc.) based on a joined user profile to the subscribing merchant web sites for presentation to the user associated with the joined user profile.

As an example, assume that ACME Company is a company that sells a significant variety of products (e.g., clothing, electronic, hardware, home related, and other products) online using an ACME Company web site, which is ACME-.net. Also, assume that in a first session, Alice is anonymously browsing the ACME.net site from her smart phone web browser and that she is browsing the ACME.net site (web site) for a potential purchase of a new digital camera. Next, assume that in a subsequent, second browsing session, Alice is anonymously browsing the ACME.net site from her tablet. Using the various cross platform user joining techniques described herein, Alice's earlier anonymous browsing session (e.g., in which in this example, Alice was viewing new digital cameras for sale on the ACME.net web site) can be associated with her subsequent anonymous browsing session on a different device, in this example her table, to provide customized web content targeted to Alice during her second anonymous browsing session (e.g., based on her associated earlier anonymous browsing session by joining such anonymous user profiles, that is, even though such sessions are/were anonymous user browsing sessions). In this example, during Alice's second anonymous browsing session, the ACME.net web site can determine one or more digital camera products on their web site to output, for example, a listing of such one or more digital camera products to display as output to Alice during her second anonymous browsing session (e.g., as suggested products, as recommended products, as featured products, as special offers, as a home page listing of products, as product advertisements, and/or in some other form of targeted/ customized web content displayed to Alice during her second anonymous browsing session on ACME.net). This approach facilitates a more 1:1, user customized web services experience, as opposed to existing approaches that cannot associate anonymous user profiles to offer customized web services, and as opposed to a typical brick and mortar shopping experience, in which all users see the same product offerings when walking into a brick and mortar store. Such products would not be displayed using typical approaches based on prior user product page views or purchases on the merchant's web site, because such products were not previously viewed during Alice's second anonymous browsing session on her tablet device and prior approaches would not have associated Alice's first anonymous browsing session with her second anonymous browsing session (e.g., or if just one of those browsing sessions were anonymous, prior approaches would not have been able to have joined such user profiles). These and other examples illustrating applications of cross platform user joining techniques are further discussed below.

In one embodiment, cross platform user joining further includes generating a joined user profile based on the first UID and the second UID. In one embodiment, cross platform user joining further includes sending the joined user profile to a web service. For example, the web service can customize content and/or personalized content presented by the web service to a user based on the joined user profile.

In one embodiment, cross platform user joining further includes determining a number of UIDs associated with each of the one or more IPs to categorize each of the one or more IPs (e.g., to provide an IP-based signal that provides more information based on the categorization of the IP address, such as whether the IP address is associated with a home IP address, a small/retail business IP address, a corporate IP address, and/or some other categorization(s)). For example, cross platform user joining can be determined using categorized IPs that are associated with certain UIDs.

In one embodiment, cross platform user joining further includes determining an intersection of relatively uncommon behaviors to facilitate an association between the first UID and the second UID. For example, in addition to IP address signal input analysis for implementing cross platform user joining, various techniques can be implemented to improve a confidence level in the association (e.g., joining) of the first and second UIDs by observing additional commonalities in behavior signals associated with the paired users (e.g., associated/joined UIDs), as further described herein with respect to various embodiments. Example behavior signals can include similarity in content of web pages visited (e.g., similar product pages on a merchant's e-commerce web site); similarity in channels the user entered a site from, such as identified via a referral URL (e.g., email, organic search, paid search, direct, etc.); similarity in queries on an internal site search; a time window in which similar user activities on a site were monitored; a navigational pattern (e.g., a pattern of browsing or searching, such as a user visiting a merchant site and searching for shoes using the site's internal search option as opposed to navigating to a particular product category or a sales category, etc.); and/or various other behavior signals (e.g., monitored using a pixel log or other techniques for monitoring user activities on a web site), as further described herein with respect to various embodiments.

In some implementations, pixel logs can be used to gather user activity data that can be associated with anonymous user profiles that can be joined using various techniques for cross platform user joining. For example, these pixel logs can be analyzed to determine incoming traffic (e.g., clicks, such as a clickstream of user activity on a site) from web sites (e.g., e-commerce merchant web sites, e-mail web sites, social sites/channels, news sites, and/or various other types of web services) and what items in particular were selected (e.g., clicked on) while the user browsed such web sites. Also, such pixels can use cookies to at least identify such tracked user activity with an anonymous user identification (UID) stored persistently on the user's device. Pixel logs or web logs can be used to monitor various types of user behavior (e.g., to provide behavior signals associated with a UID), such as one or more of the following: web pages visited; channels from which a user entered a site, which can be identified via a referral URL/URI (e.g., email, organic search, paid search, direct, etc.); queries entered by a user on an internal site search; a time on which a user browses a site or a particular web page or other content on a site; an IP address associated with a user's device from which the user is accessing a site; and a navigational pattern (e.g., pattern of browsing or searching performed by a user on a site). As would be apparent to those of ordinary skill in the art, various pixel log implementations can be provided and/or similar or other approaches can be implemented for monitoring user activities on web sites.

In one embodiment, cross platform user joining further includes applying various other behavior signals in an analysis of which UIDs can be joined based on a probability determination that such UIDs can be inferred to be associated with the same user across two or more different devices. For instance, additional types of signal input can also be used to make the cross platform user joining determinations, including, for example, sign-in by users to one or more sites, e-mail, a save for later e-mailed link to a site (e.g., in which a user can email a link to web content to their own email account to view at a later time, possibly using a different user platform/device), referral URL, user input, and/or various other information, as further described herein with respect to various embodiments.

As further described below, these and various other features and techniques are disclosed for providing cross platform user joining.

Overview of an Example Cross Platform User Joining Service

FIG. 1 is a block diagram illustrating an overview of an architecture of a system for providing cross platform user joining in accordance with some embodiments.

As shown, various user devices, such as a laptop computer 102, a desktop computer 104, a smart phone 106, and a tablet 108 (e.g., and/or various other types of computing devices that can access the Internet to browse, for example, various types of web sites) are in communication with Internet 140 to access various web sites provided by different web servers 130A, 130B, . . . , 130N (e.g., which can each serve one or more web sites).

For example, the web servers can each provide a web site, such as a merchant's web site that can offer various products and/or services for sale from the merchant and/or various other types of web sites. Each of the web sites can also include dynamic content that can be used to customize/personalize various content of the respective web site for a user accessing/browsing the web site (e.g., based on a user identification or a user profile). For example, users can generally browse the web site, in some cases from different devices, to view and/or access different content available on the web site, in some cases anonymously browsing the web site.

The web servers can also subscribe to a cross platform user joining service 120 (e.g., which can be provided as a cloud-based cross platform user joining service for web sites). In some implementations, the cross platform user joining service provides various techniques for identifying users across devices, even if such users are accessing the web sites anonymously and using multiple different/distinct devices to access the web sites, as disclosed herein.

In particular, a web server can communicate with the cross platform user joining service to receive information regarding user activities performed on the web site to the cross platform user joining service (e.g., as a user activity feed, and/or in some other format, using an API or other mechanism for communications over the Internet between the web server and the cross platform user joining service, such as using secure data communications). The cross platform user joining service can communicate, for example, joined UIDs as a data feed to the web site. As a result, this joined UIDs data feed can be applied by the web site to generate customized/personalized web content for presentation to a user associated with a joined set of UIDs.

For example, assume that Alice was anonymously browsing for digital cameras on an electronics consumer review web site while she was using her smart phone. Assume that Alice had previously visited (anonymously) that same electronics consumer review web site when she was on her work computer. The UIDs for Alice on those two different user platforms can be joined using various cross platform user joining techniques disclosed herein, and the cross platform user joining service communicates the determination of these joined UIDs to the electronics consumer review web site. As a result, when Alice is visiting that same electronics consumer review web site the following day on her work computer, the electronics consumer review web site can utilize that joined UIDs determination received from the cross platform user joining service to provide customized content to Alice, such as suggesting a new digital camera review article or by presenting targeted advertisements to Alice.

In some implementations, the cross platform user joining service can be implemented on a computer server or appliance (e.g., or using a set of computer servers and/or appliances) or as a cloud service, such as using Amazon Web Services or other cloud service providers. For example, cross platform user joining service 120 can be implemented on one or more computer server or appliance devices or can be implemented as a cloud service, such as using Amazon Web Services or another cloud service provider for cloud-based computing and storage services.

Figure 2:
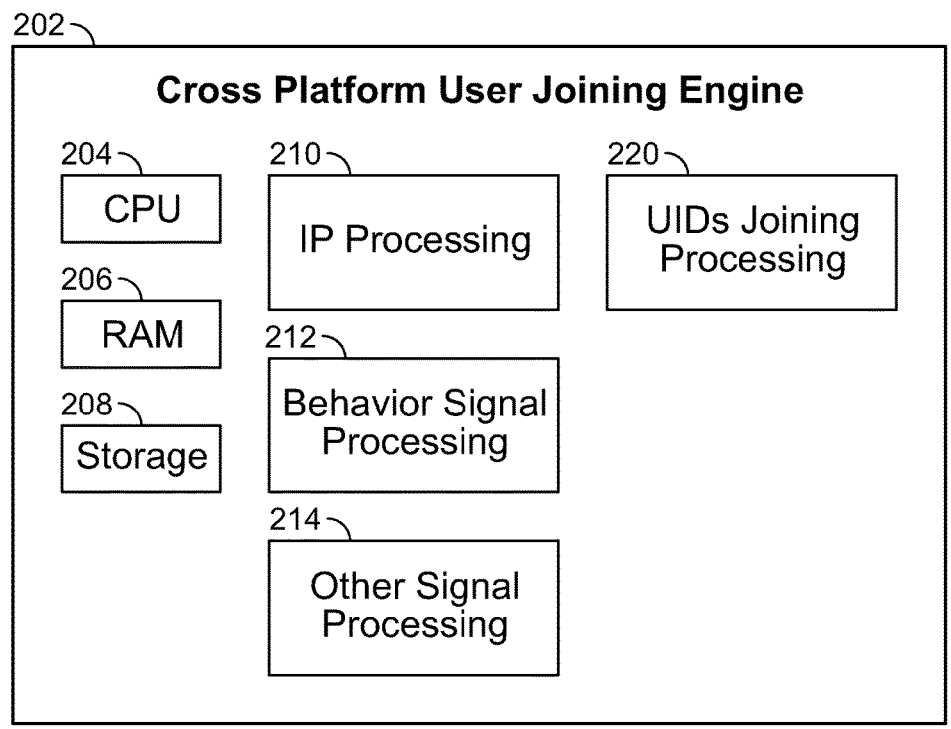
FIG. 2 is a functional block diagram illustrating a cross platform user joining engine in accordance with some embodiments.

FIG. 2 is a functional block diagram illustrating a cross platform user joining engine in accordance with some embodiments. As shown, a cross platform user joining engine 202 includes a CPU 204, a RAM 206, and a data storage 208. For example, cross platform user joining engine 202 can be implemented on the cross platform user joining service 120 as shown in FIG. 1.

As also shown in FIG. 2, cross platform user joining engine 202 includes an IP processing component 210 (e.g., to process, and in some cases, categorize IPs that are identified as associated with one or more UIDs as further described herein), a behavior signal processing component 212 (e.g., behavior signal data can be provided for subscriber/monitored web sites by using click logs/pixel tags data for monitoring user activities during a session to provide a user's browsing history, including any referral URLs associated with a product(s) on a web site, user profile data to provide information about a user including a user's explicit preferences, and/or other behavior signal data as described herein), other signal processing component 214 (e.g., for processing additional signals, such as save for later email signals, user input signals, user login signals, and/or various other signals as further discussed below), and a UID joining processing component 220 (e.g., for determining which UIDs to join for providing cross platform user joining based on input received from IP processing, behavior signal processing, and/or other signal processing components). The processing performed by each of these components is further described below. In some implementations, one or more of these functions can be performed by another device or function, such as the behavior signal processing and/or the other signal processing can be performed using another device or function, which can provide respective input to the cross platform user joining engine. As another example implementation, various components can be implemented as a common component, such as a behavior processing component can be implemented to receive and process both behavior signals and other signals. In some implementations, the cross platform user joining engine is implemented using the Apache Solr open source framework as further described below with respect to FIG. 3.

For example, cross platform user joining engine 202 can implement the cross platform user joining service 120 described above with respect to FIG. 1. For example, a cross platform user joining determination for a set of UIDs can be processed using CPU 204 and RAM 206 to automatically generate a joined set of UID results that can be stored in storage 208 and communicated to a web site that subscribes to cross platform user joining service 120 for presenting to a user via the user's web browser executed on the user's device.

Overview of Cross Platform User Joining Techniques

Figure 3:
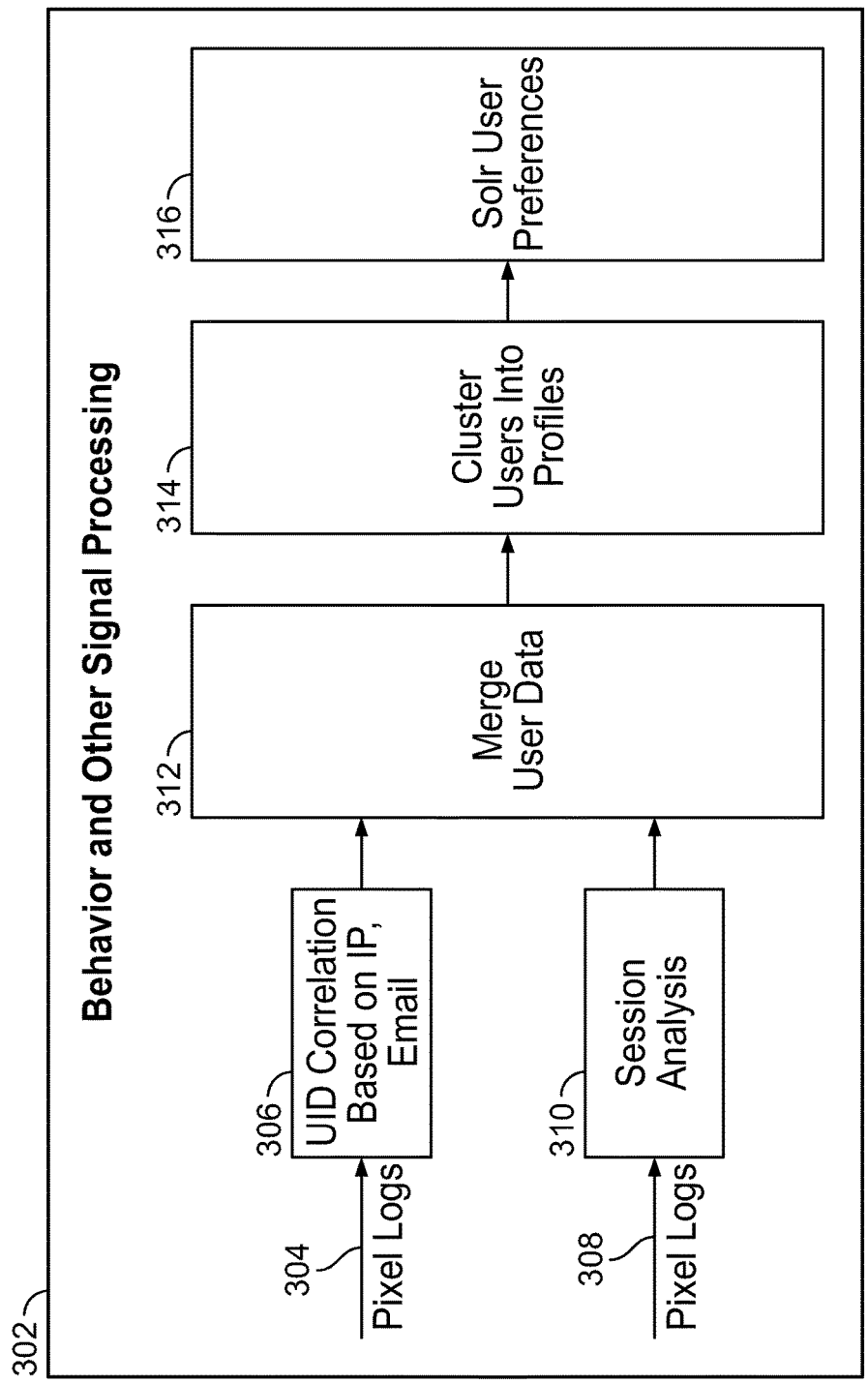
FIG. 3 is a functional diagram illustrating an architecture for IP-based, behavior signal, and other signal processing for providing cross platform user joining in accordance with some embodiments.

FIG. 3 is a functional diagram illustrating an architecture for IP-based, behavior signal, and other signal processing for providing cross platform user joining in accordance with some embodiments. For example, this architecture for IP processing, behavior processing, and other signal processing shown as 302 in FIG. 3 can be used to implement processing components shown as 210, 212, and 214 of the cross platform user joining engine illustrated in FIG. 2.

Because user activity can happen across multiple devices as users can access web sites from one or more devices (e.g., from their home computer, from their work computer, from their mobile phone, etc.), this information that is otherwise spread across different user devices can be collected and aggregated in a centralized or common data store for analysis and processing. For example, once a user identification (UID) join is identified for a set of two or more UIDs, the data for such UIDs can be merged resulting in a reduced set of unique UIDs. In addition, these users can be further clustered based on session/behavior analysis, which provides behavior signal input (e.g., monitored user activities, such as browsing behavior, navigation patterns, etc.) resulting in user profiles that can be used for example as shown in FIG. 3 as further described below.

Referring to FIG. 3, pixel logs data input 304 is received at UID correlation based on IP (e.g., IP address information) 306. For example, UID correlation based on IP 306 can process such received IP address information to correlate UIDs with such IPs. In some cases, other signal data, such as email related data, user provided data, save for later data (e.g., save for later in which an email link to a web page is sent by a user to access that web page later possibly from another device, such as when a user emails a unique link to an article when accessing a web site from their mobile phone but would rather view later on their tablet or computer), and/or other input can also be received via pixel logs 304, which can also be used for performing UID correlation with IPs.

As also shown, pixel logs data input 308 is received at session analysis 310 (e.g., for behavior analysis). For example, session analysis 310 can extract various session/behavior related data parameters (e.g., browsing activity, navigation patterns, and/or various other monitored user activities, such as described herein), associating the extracted various session/behavior related data parameters with corresponding UIDs.

As shown in FIG. 3, one use case of merged profiles of users across devices are then provided as input into a search platform, such as an Apache Solr open source search platform (e.g., or another open source or commercially available search platform can be used), to serve personalized results to each profile in accordance with some embodiments. Specifically, at 312, user data received from UID correlation based on IP, email 306 and session analysis 310 can be merged. At 314, such users can be clustered into user profiles (e.g., various clustering techniques are further described below). At 316, the Apache Solr platform can also be used to provide user preferences based on the clustered user profiles (e.g., to associate common user session/behavior data parameters with clustered user profiles).

In one embodiment, UIDs can be joined based on one or more of the following techniques: Internet Protocol (IP) address; behavior related user activities; and/or other signals. For example, other signals for providing cross platform joining can include one or more of the following: sign-in information (e.g., using HTTP, HTTPS, or other network and/or authentication protocols); user provided data (e.g., contact information); email; save for later (e.g., a special case discussed further below); and machine learning algorithms (e.g., which can enhance and/or provide new approaches or signals for providing cross platform user/UID joining) Each of these techniques for performing UID joining are discussed in more detail below.

Internet Protocol (IP) Address-Based Joining

Figure 4:
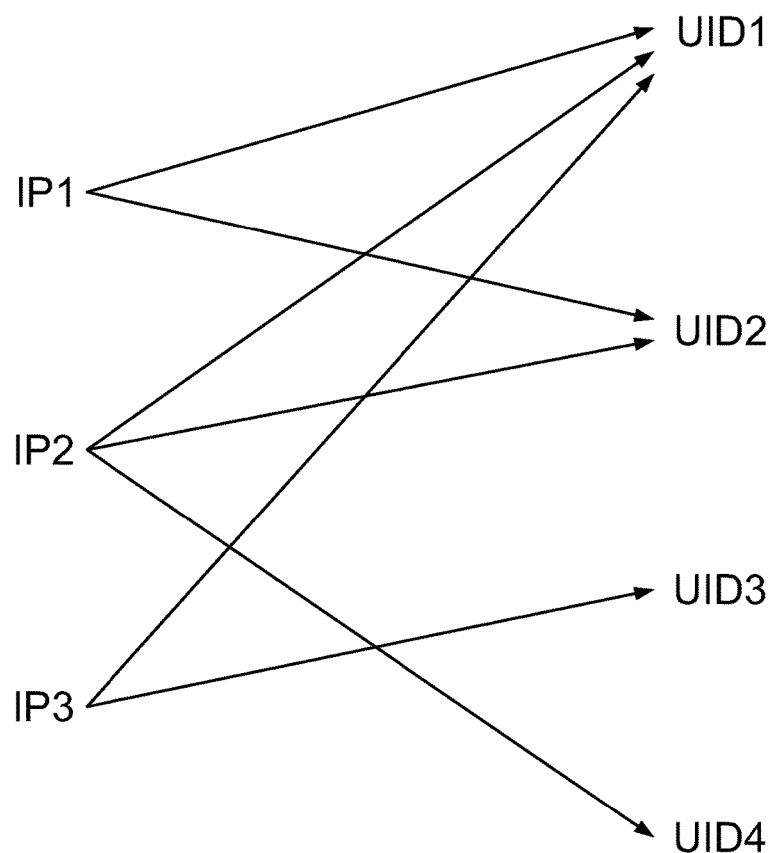
FIG. 4 is a graph diagram illustrating an association of IP addresses and UIDs for providing cross platform user joining in accordance with some embodiments.

FIG. 4 is a graph diagram illustrating an association of IP addresses and UIDs for providing cross platform user joining in accordance with some embodiments. For example, a bipartite graph can be used to illustrate a relationship between one or more IP addresses (IPs) with one or more user identifiers (UIDs).

Consider a scenario in which a user uses multiple different devices over his/her home Wi-Fi network (e.g., a laptop, a tablet, a mobile phone, and/or other devices). All of these devices will typically share the same external IP address (e.g., accessing the Internet via that same home Wi-Fi network, such that will have the same IP address for each session accessing, for example, a web site, regardless of which device the user is using to access a given web site during a particular browsing session). However, the user's cookie (e.g., set by the web site, which can be persistently stored on a user's device) on all these devices will be different. The unique cookie stored on each device corresponds to a user identifier (UID). At the same time, as a user moves from one place to another (e.g., home to office and/or to another location), his/her IP address will generally change; however, the cookie (e.g., which corresponds to a UID) on the machine will remain the same.

This type of example scenario can be illustrated using a bipartite graph of the form as described below, in which the UID as used in this example is synonymous to a cookie in the pixel logs. In this example, assume that IP1 corresponds to the IP address at this user's home, IP2 corresponds to an IP address at this user's office, and IP3 corresponds to an IP address at a local coffee shop that is visited by this user that has a local Wi-Fi that can be used by customers of the coffee shop (e.g., a free Wi-Fi access point).

Also assume that UID1 has been associated with IP1, IP2, and IP3; UID2 has been associated with IP1 and IP2; UID3 has been associated with IP3; and UID4 has been associated with IP2. In this example, a UID (e.g., associated with a user's device) can be associated with an IP address if the device associated with that UID is monitored accessing a site associated with that particular UID from that given IP address of the user's session. These IP to UID relationships in this example are illustrated in the bipartite graph shown in FIG. 4.

The following relations can be inferred across UIDs from the bipartite graph of IPs versus UIDs. In this example, UID1 is inferred to be related to UID2, UID3, and UID4; UID2 is inferred to be related to UID1 and UID4; UID3 is inferred to be related to UID1; and UID4 is inferred to be related to UID1 and UID2.

Analysis of the directed graph representation as shown in FIG. 4 will lead to identifying an anonymous user profile across all devices that share the same IP address and then extending this to multiple IP addresses based on overlapping cookies.

In an example implementation, the IP address-based joining of the users can be placed into one of three buckets for an approximate calculation (e.g., to apply a confidence level based on number of users associated with a given IP address, in which a more privately shared IP address can provide a higher confidence/probability than a more publicly shared IP address for performing cross platform user joining) as described below.

Household Private IP: if the IP address is shared by, for example, 1-4 devices, the cross platform user joining service can reliably infer that it is either the same user or at least the same household.

Small-Medium Group IP: if the IP address is shared by 5-20 people, most likely these people have some common interests, demographics, and/or other aspects or attributes that can be reasonably inferred by the cross platform user joining service. For example, such persons may be part of the same Small/Medium Business (SMB) or may be frequent visitors of the same coffee shop or another location.

Public IP/Corporate IP: if an IP address is shared by more than, for example, 21-100+ users, it generally provides less information than can be reliably inferred by the cross platform user joining service. In this case, either the observed IP address belongs to an Internet Service Provider (ISP) or some large entity (e.g., a large corporation, a governmental organization, or another large entity). In such cases, the IP address can be ignored by the cross platform user joining service.

As will be apparent to those of ordinary skill in the art, these ranges of numbers of devices can vary and are generally a continuum that can be used for categorization that can be associated with different inferences with different confidence levels as further described below.

In some implementations, the cross platform user joining service uses UID and IP data collected across multiple different sites, such as e-commerce merchant web sites, news web sites, social networking web sites, email web sites, and/or other types of sites.

In some implementations, merchant/other web site provider data sets and external data sets can be used to supplement this categorization (e.g., to provide more information regarding IP addresses for enhanced IP address categorizations). For example, web log data (e.g., web log data can include pixel log data) that is collected and analyzed across a plurality of merchants/other web site providers can be used to implement enhanced IP address categorizations. In some cases, data from service providers regarding IP addresses can be used to supplement these techniques to make more refined inferences (e.g., ISPs and/or other third party service providers that provide various information regarding allocated IP address information). For example, if an Internet Service Provider (ISP) provides IP address data that indicates that IP2 is a coffee shop or other small retail enterprise, then that additional information can be used by the cross platform user joining service to perform a more reliable inference (e.g., on how likely it is, how probable it is) on whether UIDs associated with that IP2 are (likely) associated with the same user.

Cross Platform User Joining System Architecture

Figure 5A:
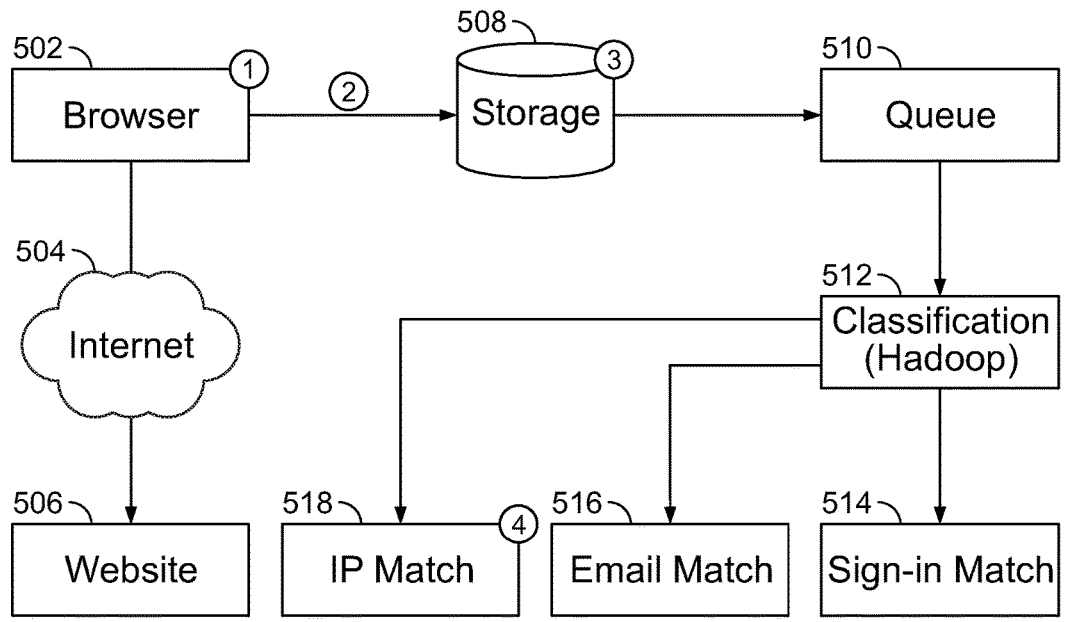
FIGS. 5A and 5B are functional block diagrams illustrating overviews of an offline architecture and an online architecture of a system for providing cross platform user joining in accordance with some embodiments.
Figure 5B:
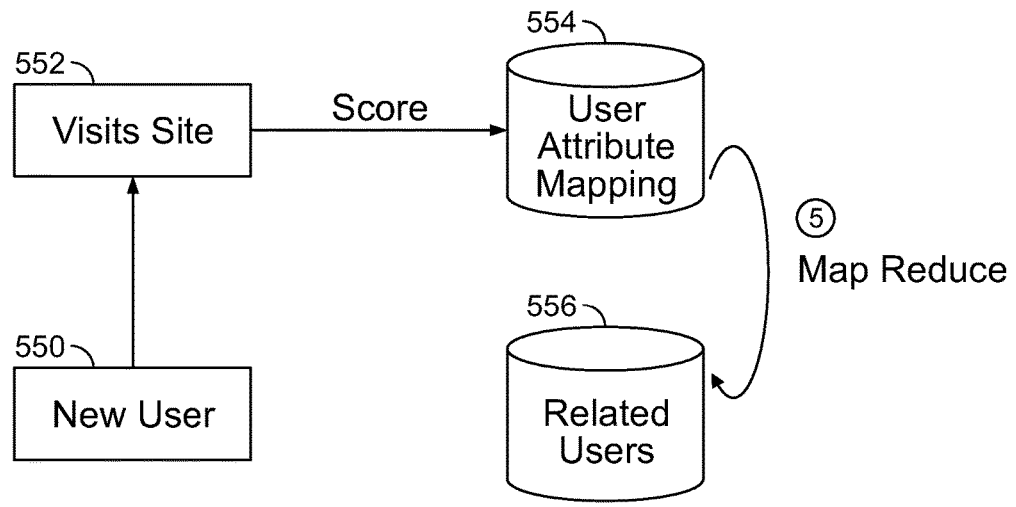

FIGS. 5A and 5B are functional block diagrams illustrating overviews of an offline architecture and an online architecture of a system for providing cross platform user joining in accordance with some embodiments.

Building on this example, in some embodiments, a solution includes the following operations that can be automatically performed by a service and/or a system for cross platform user joining (e.g., a cross platform user joining service, such as described above with respect to FIG. 1, and/or a cross platform user joining engine, such as described above with respect to FIG. 2), which can perform a process such as shown in FIGS. 5A and 5B.

In some implementations, additional information, such as behavior signals, can be applied to increase confidence in cross platform user joining based on IP addresses. For example, user behavior can also be monitored to further refine the categorization/inferences of UIDs based on IP addresses, such as by associating common events across UIDs (e.g., monitored behavior, such as various user activity, including, for example, browsing for men's running shoes, or browsing for women's running shoes, browsing sale sections of e-commerce merchant sites, viewing a news web site's home page versus viewing a news web site's particular international news section, versus tracking a particular author, versus browsing a particular article, etc.). As further described below, these techniques attempt to identify events that are relatively unique events that are common between a set of UIDs.

Referring now to the offline method as shown in FIG. 5A, as shown at step 1 of FIG. 5A, a user visits a service provider on multiple platforms. For example, a user executes a browser 502 on a user platform (e.g., a user's local client device) to access a web site 506 via the Internet 504. In this example, the web site service provider creates a persistent first-party cookie to assign a unique identifier (UID) to the user's device that the user is using to access web site 506. This cookie and UID allows the server to continue to identify the device in later web sessions (e.g., the cookie is persistent).

As shown at step 2 of FIG. 5A, a web log collects critical data (e.g., using pixel log data) on the information each unique user profile makes and receives (e.g., using a platform for cross platform user joining that can receive pixel log data from browser 502). As an example, for an e-commerce site, such information can include the following: IP address, what parts of a web site a user clicks on, when a user chooses to include an item in the shopping cart, purchase an item, and other shopping actions, registration events, viewing of products, payment actions, and/or other activities.

As shown in Step 3 of FIG. 5A, user data collected from the web log for each device is stored in a data store (e.g., a storage device), shown as a data storage 508. In particular, each device is associated with its unique cookie/unique identifier (UID). The user data associated with each UID can be queued for analysis at queue 510, classified using an Apache Hadoop framework to provide a classification engine 512 (e.g., or other open source frameworks or other commercially available solutions for providing large data set analysis can be used for the classification engine), and the multiple signals can be analyzed to determine whether a match is determined, such as based on a sign-in match 514, an email match 516, and/or an IP match 518, as further discussed below with respect to step 4.

As shown at step 4 of FIG. 5A, a list of IPs that the device/UID has been observed accessing the web service is determined using various engines for cross platform user joining, including a sign-in match engine 514, an email match engine 516, and/or an IP match engine 518 (e.g., the cross platform user joining engine as described above with respect to FIG. 2).

For example, for each IP address, the following operations can be performed as described below. A search operation can be performed across web logs to find other UIDs that have connected to the web site using that IP address. A determination of a number of devices that have connected using that IP address over a particular time period (e.g., in the past week or another time period) can be performed. Next, a probability can be calculated and assigned that the pairs of users found on that IP are the same user. In this example, high probability pairs of the type A:B, A:C can be used to form clusters of users that are highly similar to A:B:C, which can then have a probability that the user is again the same. In particular, a methodology and various factors for determining probability are further described below. At this stage of processing, the processing can proceed to a next IP address. Email and other signals for facilitating cross platform user joining are also further described below.

Referring now to the online method as shown in FIG. 5B, for new users, the cross platform user joining engine can associate a new UID with a set of related users, based on already existing attributes of other users stored in a user attribute mapping database 554 and the known attributes of the new user received from the visited site 552. As shown, when a new user 550 visits site 552, new user attributes can be sent to user attribute mapping 554. At step 5 of FIG. 5B, based on the new user attributes received from the visited site and based on already existing attributes of other users stored in a user attribute mapping database 554, a Map Reduce processing operation is performed at step 5 as shown to determine a list of related users provided in a related users data set/store 556.

Thus, using these techniques, the cross platform user joining service can generate a list of devices/UIDs that are likely to belong to the same user profile and assign a confidence level to that match.

IP-Based UID Joining

Figure 6:
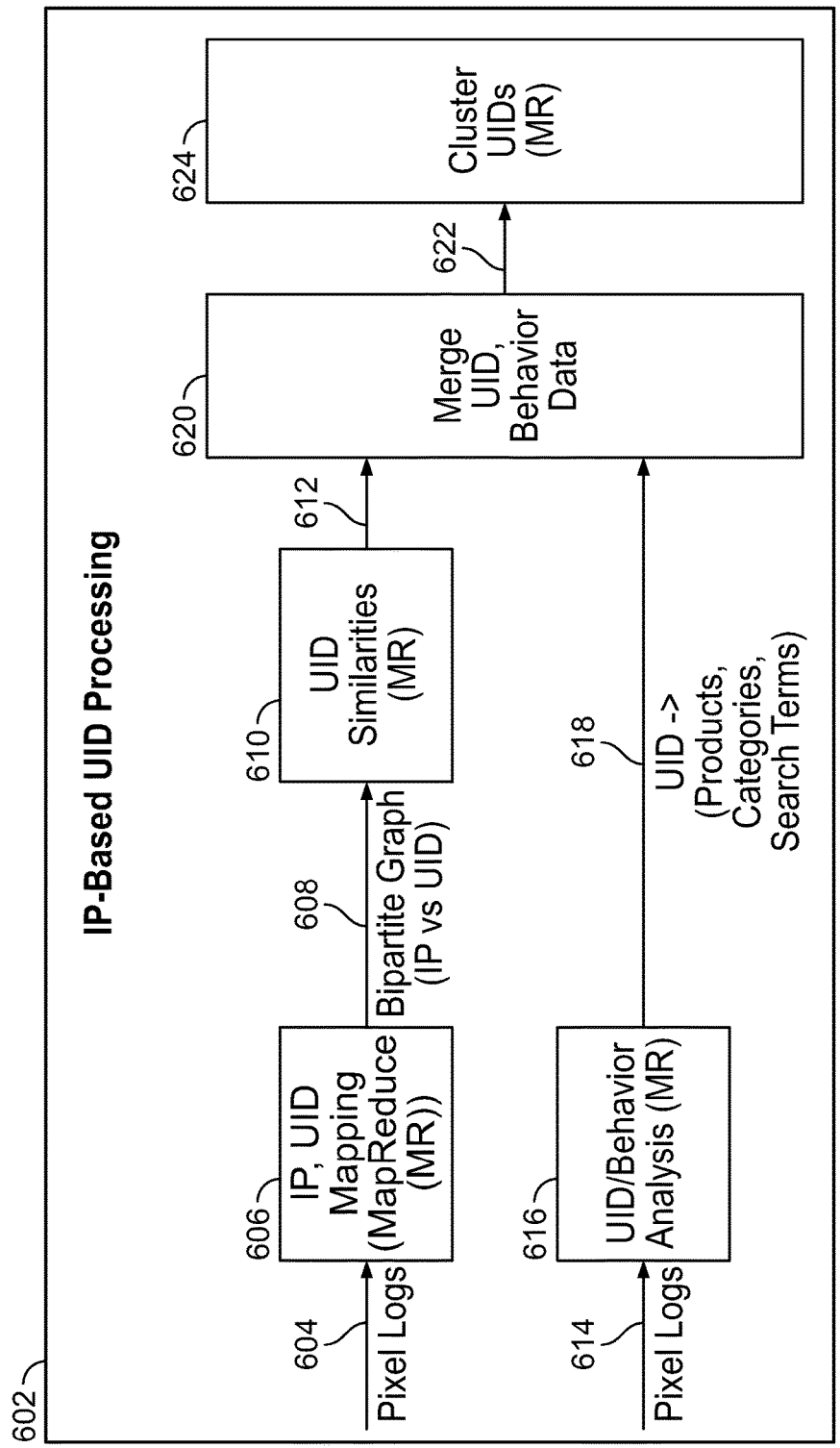
FIG. 6 is a functional diagram illustrating an architecture for IP-based UID processing for providing cross platform user joining in accordance with some embodiments.

FIG. 6 is a functional diagram illustrating an architecture for IP-based UID processing for providing cross platform user joining in accordance with some embodiments. For example, this architecture for IP-based UID processing shown as 602 in FIG. 6 can be used to implement UIDs joining processing component shown as 220 of the cross platform user joining engine illustrated in FIG. 2.

As shown in FIG. 6, IP-based UID joining can be provided to serve personalized results to each user profile (e.g., joined UIDs) in accordance with some embodiments. As discussed below, the IP-based UID joining process can combine IP data with other behavior analysis signal data (e.g., user clickstream-based signals and/or other behavior signals) to merge UIDs to create pairs of users along with confidence measurements, as further described below.

Referring to FIG. 6, pixel logs data input 604 is received at IP, UID mapping component 606. For example, the IP, UID mapping can be implemented using a Map Reduce (MR) (e.g., also commonly referred to as MapReduce) processing operation(s). The result of this IP, UID mapping is a generation of a bipartite graph 608 (e.g., providing an IP versus UID bipartite graph, such as shown in FIG. 4 as discussed above). Bipartite graph 608 is provided to a UID similarities component 610 for determining a mapping of (likely) related/associated UIDs at 612. The UID to UID relationship mapping result 612 is provided to merge UID, behavior data component 620.

As also shown, pixel logs data input 614 is received at UID/behavior analysis component 616. For example, UID/behavior analysis component 616 can determine an association of various behaviors (e.g., products, categories, search terms, etc.) to each UID, which can be implemented using a Map Reduce (MR) processing operation(s). The result of this UID to behavior(s) relationships result 618 is also provided to merge UID, behavior data component 620.

Merge UID, behavior data component 620 receives input 612 and 618 and merges the received UID and behavior data to generate merged UID, behavior data results 622. The merged UID, behavior data results 622 are provided as input to a cluster UIDs component 624 (e.g., which can also be implemented using a Map Reduce operation(s)). Also, at 624, one or more machine learning algorithms can be implemented to facilitate the clustering operation(s). Various machine learning algorithms that can be used to implement the clustering operation(s) are further described below.

Calculating Probability/Confidence with Behavior Data

In addition to using the pure IP address signal, the cross platform user joining engine can enhance the confidence in the joining of UIDs (e.g., pairing of users) further by observing additional commonalities in the behaviors (e.g., clickstream) of the paired users/joined UIDs.

For example, this probability can be computed as shown below.

Given that two devices exist each with the following UID to event (e.g., behavior event) relationships, the probability that two distinct UIDs are associated with the same user can be expressed as follows.

$UID_1$ is associated with events($E_{n1} \ldots E_{n2}$)

$UID_2$ is associated with events($E_{n3} \ldots E_{n4}$)

$E_{1,2}$ is the set of common events between $UID_1$ and $UID_2$ $P(UID_{n3}, UID_n$ are same user$)=P(2$ random UIDs have $E_{1,2}$ in common$|(n2-n1)$ events for one UID and $(n4-n3)$ events for the other UID$)$ For example, probabilities can be calculated by the same cross platform user joining engine periodically sampling historical behavior signal data.

In an implementation using Monte Carlo simulations, the cross platform user joining engine can then compute the likelihood of the users to be the same. For example, user history can then be determined using the weighted average of the probabilities associated with each UID and their respective user history as shown below.

$$\text{Events for } UID_1 = \sum_{n=1}^{n} P(UID_1, UID_n \text{ are same user}) * \text{Events } UID_n$$

This weighted average set of events can then be used for further upstream algorithms that receive $UID_1$ history as an input (e.g., a personalization algorithm, such as for providing personalized or customized content on a site to a given user).

For example, if the devices/UIDs identified as potentially belonging to the same user both show visits to the same page on a site (e.g., an event in common), then the cross platform user joining engine can automatically join the users together with higher confidence. Further, if the probability of two users picked at random having visited that page is relatively low, then the cross platform user joining engine can automatically determine with increased confidence that the user across the devices is the same user. That is, this probability determination facilitates determining relatively unique events to assist in cross platform user joining based on using behavior data (e.g., relatively unique common set of events, such as when $UID_1$ and $UID_2$ are monitored to both have visited a common set of international news stories related to a particular country and news stories by a particular author on a news site, as opposed to $UID_3$ and $UID_4$ both visiting a home page of a popular news site).

Similarly, the cross platform user joining engine can use one or more of the other characteristics to determine the probability that two distinct UIDs belong to devices of the same user. For example, these characteristics can include one or more of the following: similarity in content of web pages visited (e.g., similar product pages); similarity in channels a user entered site from, such as identified via a referral URL (e.g., email, organic search, paid search, direct, etc.); similarity in queries on internal site search; a number of common IP addresses; a time window in which these similar actions were seen; a geo-location of the set of IP addresses associated with the UIDs (e.g., ISPs and other services provide a mapping of IPs to geo-locations); and a navigational pattern (e.g., pattern of browsing or searching, such as visiting a merchant's web site and searching for shoes as opposed to navigating to a particular product category versus an on sale category, etc.).

In some embodiments, additional information can be used based on user provided data, such as login, forms input, and/or other user provided data, as is now further described below, including sign-in based UID joining, user information-based UID joining, email-based user joining, and save for later-based UID joining, each discussed in more detail below.

Sign-In Based UID Joining

If a user signs into multiple devices, the cross platform user joining engine can automatically join the UIDs (e.g., cookies) across these devices based on the user's login information. If the sign-in happens to be behind a secure login (e.g., a login using HTTPS or another secure authentication protocol), web site service provider data can assist the cross platform user joining engine in joining such users. For example, merchant provided data can be communicated to the cross platform user joining engine, in which that merchant provided data includes an identification of the user's identity based on the user logging into the web site (e.g., which can be securely provided to the cross platform user joining engine using above-described communication mechanisms that allow for secure communications between the merchant's web site server and the cross platform user joining service).

In some cases, sign-in for a site may be with or without password authentication. Other forms of sign-in can include providing an email address, a social networking site login (e.g., Facebook®, LinkedIn®, Google®, or other social networking sites), a federated login service (e.g., OpenID or other federated login services), and/or other types of sign-in operations, which can similarly be used to implement this sign-in based UID joining.

User Provided Information-Based UID Joining

Similar to sign-in based UID joining techniques, the cross platform user joining engine can accept user entered information on a web site/web service to join users. For example, credit card, addresses, phone numbers, and other contact information entered by the user can be used to link a UID on a particular device to other UIDs (e.g., such information can be monitored using pixel logs while a user is interacting with the web site/web service, such as from entry data, etc.).

Email-Based UID Joining

Similar to IP address-based UID joining techniques, the cross platform user joining engine can automatically identify users across platforms through their interaction with email. For example, anytime an email is opened on multiple devices, the cross platform user joining engine can join the user across these devices/UIDs if the email link contains a unique identifier or code specific to that user. In some cases, certain service providers can provide this information as part of a referral URL that can be monitored using a pixel log.

Special Case—Save for Later-Based UID Joining

Save for later-based UID joining is an example special case. This case involves promoting emails that allow users to, for example, email themselves a link to a product to later purchase that product on desktop and/or to later view that web content such as an article at a later time possibly on a different device.

For example, consider the following process flow for this use case scenario. A user browses a web site on the user's first device, such as the user's mobile phone. The user would like to bookmark certain items to view later on another device, such as their laptop or tablet. In this example, the user can select those items and send those to their email address to view later on another device. The email can include a unique link that when opened on another device will allow the user to access these items. Because the link is unique, if the user accesses it on another device, that unique link can also be used by the cross platform user joining engine as a signal (e.g., monitored using a pixel log on each device) to identify other devices the user may use.

As a result, such a feature can allow a user to save items for later and can be used as a signal by the cross platform user joining engine in joining users across devices—UID joining. As another example, a user of a news web site can share a news article that was viewed by the user first on their mobile phone by emailing a link to that article to themselves, and then the user can choose to save for later that news article so that the user can view this article on another device, such as their tablet at a later date by clicking the link in the email. These techniques can then be used to associate the UIDs of that user's smart phone and that user's tablet.

Machine Learning Techniques to Expand Coverage of UID Joining

Using the various techniques described above, users across devices (e.g., UIDs) can be automatically merged at different confidence levels. For example, using the high-confidence user joins, patterns/features can be mined to learn what intrinsic features are exclusive to high-confidence user joins.

In some embodiments, machine learning classification algorithms can be implemented to classify whether a pair of different UIDs belong to the same user, and at what confidence level. For example, the training data for such a machine algorithm(s) is based on high confidence matches that can be provided either from the IP join or through other joining techniques described herein (e.g., sign-in based joining).

Some of the features in such a machine algorithm(s) can include, for example, one or more of the following: a number of common IP addresses the two UIDs have browsed from; a number of common private IP addresses; a similarity between behavior signals (e.g., clickstreams) on the different platforms using product/category page views; a similarity between behavior signals (e.g., using clickstreams) using search queries weighted by the frequency of the common search queries; a probability of common search queries or product/category page views in two randomly chosen behavior signals (e.g., using clickstreams); a similarity between behavior signals (e.g., using clickstreams) using similarity of product types viewed; a time between the visits from the different platforms; a location obtained from IP-based geo-location data; and different signatures of a particular visit (e.g., median time spent on product/category/search pages, and/or a shorthand representation of the state transitions represented in the clickstream).

For example, based on one or more of these features, a machine learning algorithm can seek to discover patterns in the training data set and apply those to new sets of users. Thus, these machine learning techniques can lead to expanded coverage beyond just the joining techniques specifically described above.

As an example implementation, a machine learning based implementation can learn related users as described below. For example, assume that there are N users stored in the database, and the objective is to determine groups of related users (e.g., related UIDs). In this context, related users can be defined to be the same person accessing the site as different users. The difference is manifested, because of the use of cookies for tracking purposes (e.g., the same person can be allocated different cookies or UIDs when, for example, accessing the site using different devices, such as their desktop computer and their mobile device). Hence, a person using a desktop computer and a mobile device will generally be classified as two different users (e.g., allocated two distinct UIDs).

In this example, assume there are two users, A and B, whose attributes are represented as attributes(A) and attributes(B), respectively. The probability that A and B represent the same user can be computed as follows:

$$P(A = B \mid \text{attributes}(A), \text{attributes}(B)) = \frac{P(A = B \text{ and attributes}(A) \text{ and attributes}(B))}{P(\text{attributes}(A) \text{ and attributes}(B))}$$

Given a training data set of related users, the above probability can be computed using, in some implementations, using a count. In this example, the training data can be in the form of pairs of users, A and B, and their attributes and a target label denoting if they are related users or not.

As would now be apparent to one of ordinary skill in the art, the larger the training data set, the more accurate would be the results for applying such machine learning techniques to compute the above-described probabilities. In some implementations, in order to mitigate potential inaccuracies based on the size of the training data set being used, various smoothing techniques can be implemented, such as the Jelinek-Mercer smoothing, add-one smoothing, Katz backoff smoothing, and/or various other smoothing algorithms can be implemented. In particular, the use of such smoothing techniques facilitates an accurate computation of these probabilities even for smaller training data sets.

In some implementations, given the training data, the above-described probability computational problem can be posed as a standard classification problem. As such, in some implementations, various classification algorithms can be used to provide a machine learning based implementation that can learn related users, such as random forests, Support Vector Machines (SVM), and/or various other classification algorithms as would now be apparent to one of ordinary skill in the art.

Further, the above-described cross platform user joining system has a positive feedback loop in which the system learns continuously from the user pairs that are merged using the various techniques described herein.

Example Front-End Application of Cross Platform User Joining Engine

Figure 7:
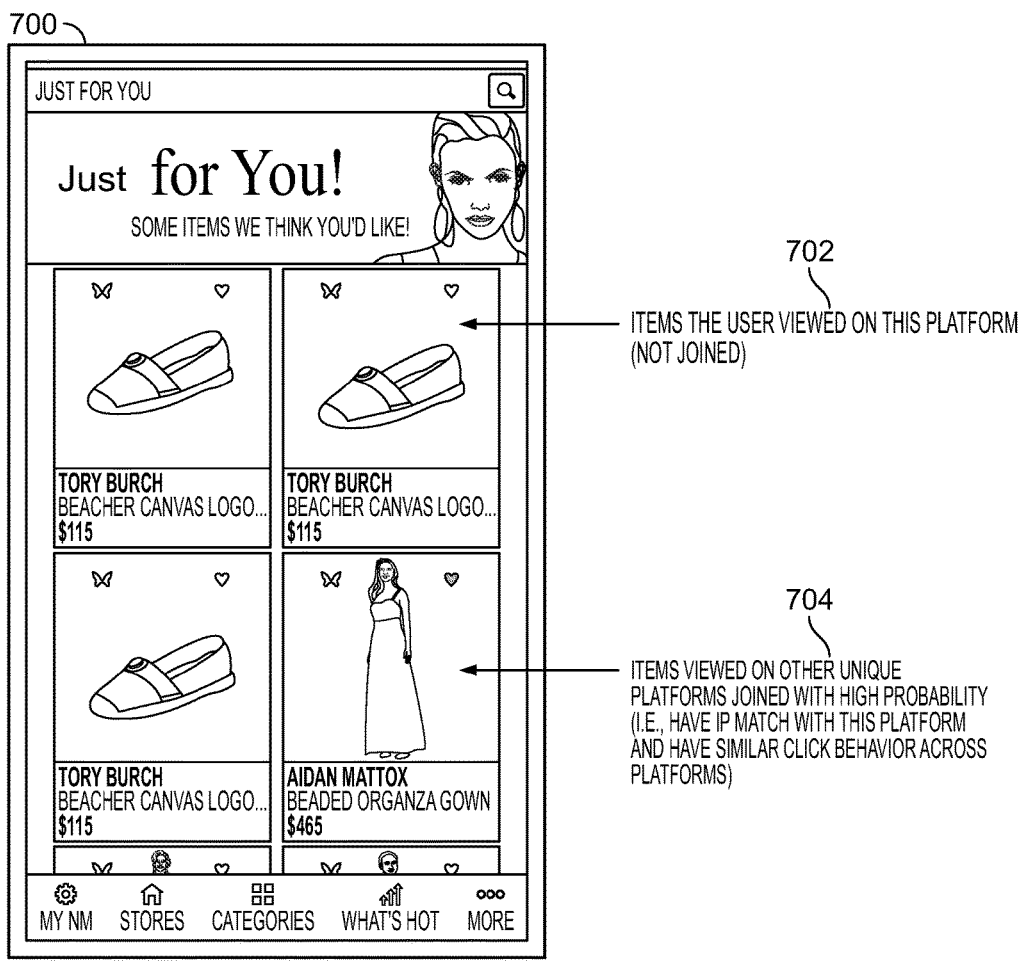
FIG. 7 is a screen diagram illustrating a graphical user interface (GUI) of a web interface for providing cross platform user joining in accordance with some embodiments.

FIG. 7 is a screen diagram illustrating a graphical user interface (GUI) of a web interface for providing cross platform user joining in accordance with some embodiments. In particular, FIG. 7 illustrates a screen image 700 of a front-end display showing various product items output on an example merchant's web site. At 702, items that the user viewed on this device/user platform (not joined) are shown. At 704, items viewed on other unique devices/user platforms joined with high probability are shown. In this example, a high probability can be inferred based on UIDs that have an IP match with this device/UID and also have similar behavior(s) across such joined UIDs/devices (e.g., and/or other cross platform user joining techniques can be implemented to determine a high probability, as described herein, such as a sign-in match, user provided information, and/or other techniques).

Further, this information accumulated about the user and joined user data can be used in various forms. For example, recommendations and/or other customized/personalized content based on a user history that is provided via joined user profiles can be presented to the user.

Various other formats and/or icons can be provided to provide a GUI for implementing cross platform user joining as will now be apparent to one of ordinary skill in the art.

Example Processes for Cross Platform User Joining

Figure 8:
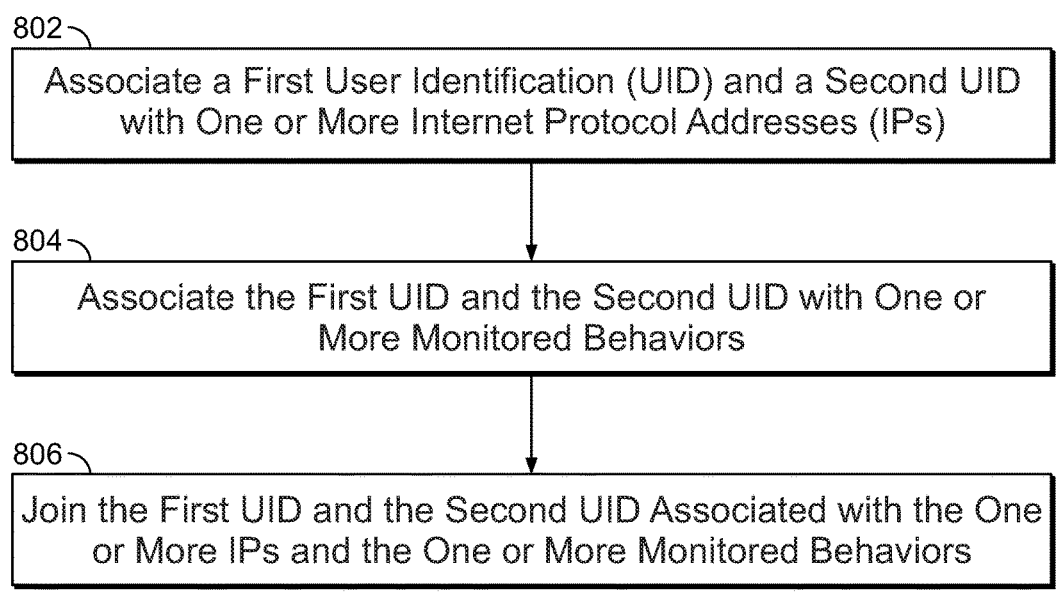
FIG. 8 is a flow diagram illustrating a process for providing cross platform user joining in accordance with some embodiments.

FIG. 8 is a flow diagram illustrating a process for providing cross platform user joining in accordance with some embodiments. In some embodiments, the process for providing cross platform user joining is performed using the cross platform user joining system/service, such as described above with respect to FIGS. 1-7.

Referring to FIG. 8, at 802, associating a first user identification (UID) and a second UID with one or more Internet Protocol addresses (IPs) is performed. For example, the first UID can be associated with a first user platform (e.g., a user's laptop), and the second UID can be associated with a second user platform (e.g., a user's smart phone). In some cases, at least one of the first UID and the second UID can correspond to an anonymous UID (e.g., the UID has not been associated with an authorized user sign-in).

At 804, associating the first UID and the second UID with one or more monitored behaviors is performed. For example, a pixel log data stream can be used to monitor user behavior, which is provided to a cross user platform service for associating with UIDs.

At 806, joining the first UID and the second UID based on the one or more IPs and the one or more monitored behaviors is performed. In some implementations, a number of UIDs associated with each of the one or more IPs is determined to categorize each of the one or more IPs. In some cases, external data sources can be used to classify or categorize IPs, such as described above.

For example, if a distinct set of UIDs are determined to be associated with two different IP addresses (e.g., both of which have been categorized as being associated with private residences), and if the distinct set of UIDs have also been associated with similar behavior signals, then the distinct set of UIDs can be joined, such as further described below with respect to FIG. 9.

Figure 9:
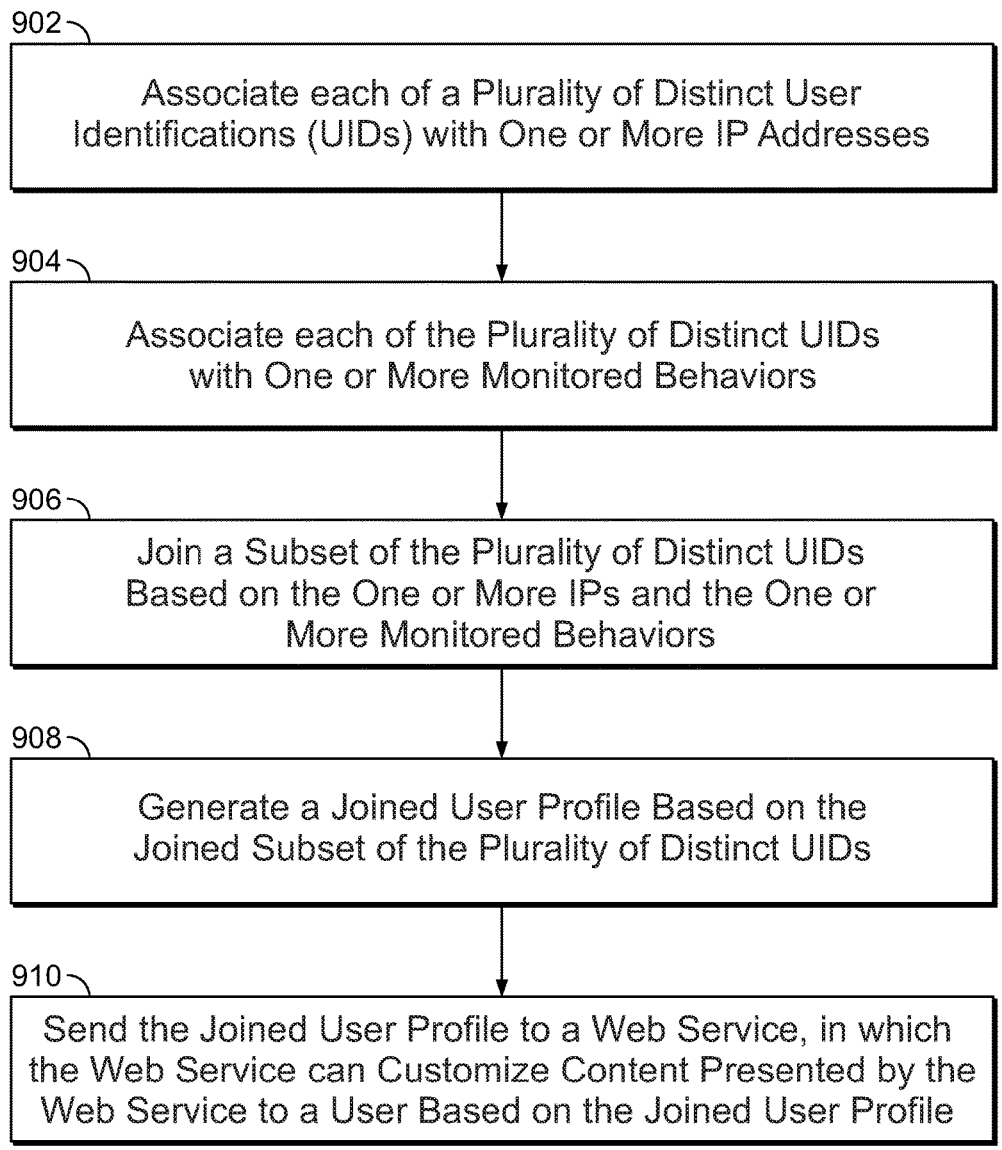
FIG. 9 is another flow diagram illustrating a process for providing cross platform user joining in accordance with some embodiments.

FIG. 9 is another flow diagram illustrating a process for providing cross platform user joining in accordance with some embodiments. In some embodiments, the process for providing cross platform user joining is performed using the cross platform user joining system/service, such as described above with respect to FIGS. 1-7.

Referring to FIG. 9, at 902, associating each of a plurality of distinct user identifications (UIDs) with one or more IP addresses is performed. For example, a pixel log data stream can be used to monitor IPs, which is provided to a cross user platform service for associating with UIDs.

At 904, associating each of the plurality of distinct UIDs with one or more monitored behaviors is performed. In some implementations, a variety of behavior and other signals can be collected and associated with UIDs, as discussed above with respect to various embodiments.

At 906, joining a subset of the plurality of distinct UIDs based on the one or more IPs and the one or more monitored behaviors is performed. For example, if a subset of the plurality of distinct UIDs is determined to be associated with a particular set of different IP addresses (e.g., which have been categorized as being associated with private residences), and if the subset of the plurality of distinct UIDs has also been associated with common behavior signals that are determined to be (relatively) unique to this subset of the plurality of distinct UIDs, then the subset of the plurality of distinct UIDs can be joined (e.g., with a determined confidence level).

At 908, generating a joined user profile based on the joined subset of the plurality of distinct UIDs is performed. For example, user behaviors monitored with each of the joined UIDs can be associated with the joined user profile.

At 910, sending the joined user profile to a web service, in which the web service can customize content presented by the web service to a user based on the joined user profile is performed. For example, using a user profile based on a plurality of UIDs that have been joined based on such cross platform user joining techniques, content on the web site can be customized and/or personalized for presentation to the user based on the joined user profile. In some cases, a recommended category of content can be displayed automatically or in response to a user request on a web site.

In some implementations, a cloud service provides suggested/customized web content for subscribing merchant web sites (e.g., suggested content/products/categories, etc.) based on a joined user profile to the subscribing (merchant) web sites for presentation to the user associated with the joined user profile.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for cross platform user joining, comprising:
a processor configured to:
associate a first user identification (UID) and a second UID with one or more Internet Protocol addresses (IPs);
associate the first UID and the second UID with one or more monitored behaviors;
join the first UID and the second UID based on the one or more IPs and the one or more monitored behaviors, wherein the joining of the first UID and the second UID comprises to:
determine whether a first user platform associated with the first UID emailed a user an email including a link including a product to purchase later and a second user platform associated with the second UID opened, from the email, the link including the product to purchase later, the link including a unique identifier or a code specific to the user; and
in the event that the first user platform associated with the first UID emailed the user the email including the link including the product to purchase later and the second user platform associated with the second UID opened, from the email, the link including the product to purchase later, join the first and second UIDs;
generate a joined user profile based on the first UID and the second UID; and
send the joined user profile to a web service, wherein the web service can customize content presented by the web service to the user based on the joined user profile; and
a memory coupled to the processor and configured to provide the processor with instructions.

2. The system recited in claim 1, wherein the first UID is associated with a first set of monitored behaviors, and the second UID is associated with a second set of monitored behaviors.

3. The system recited in claim 1, wherein the first UID is associated with a first mobile device, and the second UID is associated with a second mobile device, and wherein at least one of the first UID and the second UID corresponds to an anonymous UID.

4. The system recited in claim 1, wherein the one or more monitored behaviors are tracked using a pixel log.

5. The system recited in claim 1, wherein the one or more IPs are tracked using a pixel log.

6. The system recited in claim 1, wherein the processor is further configured to:
determine a number of UIDs associated with each of the one or more IPs to categorize each of the one or more IPs.

7. A method of cross platform user joining, comprising:
associating a first user identification (UID) and a second UID with one or more Internet Protocol addresses (IPs);
associating the first UID and the second UID with one or more monitored behaviors;
joining the first UID and the second UID based on the one or more IPs and the one or more monitored behaviors, wherein the joining of the first UID and the second UID comprises:

determining whether a first user platform associated with the first UID emailed a user an email including a link including a product to purchase later and a second user platform associated with the second UID opened, from the email, the link including the product to purchase later, the link including a unique identifier or a code specific to the user; and in the event that the first user platform associated with the first UID emailed the user the email including the product to purchase later and the second user platform associated with the second UID opened, from the email, the link including the product to purchase later, joining the first and second UIDs;

generating a joined user profile based on the first UID and the second UID; and sending the joined user profile to a web service, wherein the web service can customize content presented by the web service to the user based on the joined user profile.

8. The method of claim 7, wherein the first UID is associated with a first set of monitored behaviors, and the second UID is associated with a second set of monitored behaviors.

9. The method of claim 7, wherein the first UID is associated with a first mobile device, and the second UID is associated with a second mobile device, and wherein at least one of the first UID and the second UID corresponds to an anonymous UID.

10. The method of claim 7, further comprising:
determining a number of UIDs associated with each of the one or more IPs to categorize each of the one or more IPs.

11. A computer program product for cross platform user joining, the computer program product being embodied in a tangible computer readable storage medium and comprising computer instructions for:
associating a first user identification (UID) and a second UID with one or more Internet Protocol addresses (IPs);
associating the first and second UIDs with one or more monitored behaviors;
joining the first and second UIDs based on the one or more IPs and the one or more monitored behaviors, wherein the joining of the first UID and the second UID comprises:
determining whether a first user platform associated with the first UID emailed a user an email including a link including a product to purchase later and a second user platform associated with the second UID opened, from the email, the link including the product to purchase later, the link including a unique identifier or a code specific to the user; and in the event that the first user platform associated with the first UID emailed the user the email including the link including the product to purchase later and the second user platform associated with the second UID opened, from the email, the link including the product to purchase later, joining the first and second UIDs;

generating a joined user profile based on the first UID and the second UID; and sending the joined user profile to a web service, wherein the web service can customize content presented by the web service to the user based on the joined user profile.

12. The computer program product recited in claim 11, wherein the first UID is associated with a first set of monitored behaviors, and the second UID is associated with a second set of monitored behaviors.

13. The computer program product recited in claim 11, wherein the first UID is associated with a first mobile device, and the second UID is associated with a second mobile device, and wherein at least one of the first UID and the second UID corresponds to an anonymous UID.

14. The computer program product recited in claim 11, further comprising computer instructions for:
determining a number of UIDs associated with each of the one or more IPs to categorize each of the one or more IPs.

15. The system recited in claim 1, wherein the joining of the first UID and the second comprises to:
train a machine algorithm based on a number of common IP addresses the first and second UIDs have browsed from, a number of common private IP addresses, a similarity between behavior signals or clickstreams on different platforms using product or category page views, a similarity between behavior signals or clickstreams using search queries and a frequency of common search queries, a probability of common search queries, product page views, or category page views in two chosen behavior signals or clickstreams, a similarity between behavior signals or clickstreams based on a similarity of product types viewed, a time between visits from different platforms, a location obtained from IP-based geo-location data, different signatures of a particular visit, or any combination thereof; and
join the first and second UIDs based on the machine algorithm.

* * * * *